(12) United States Patent  (10) Patent No.: US 7,414,334 B2
Grundmann  (45) Date of Patent: Aug. 19, 2008

(54) CIRCUIT ARRANGEMENT FOR LIMITATION OF OVER-VOLTAGES IN ENERGY STORAGE MODULES

(75) Inventor: Steffen Grundmann, Bonstetten (CH)

(73) Assignee: Inventio AG, Hergiswil NW (CH)

( * ) Notice: Subject to any disclaimer, the term of this patent is extended or adjusted under 35 U.S.C. 154(b) by 304 days.

(21) Appl. No.: 11/157,628

(22) Filed: Jun. 21, 2005

(65) Prior Publication Data

US 2005/0280968 A1  Dec. 22, 2005

(30) Foreign Application Priority Data

Jun. 21, 2004  (EP) .................................. 04405381

(51) Int. Cl.
*H02M 3/18* (2006.01)
(52) U.S. Cl. ..................................... 307/110
(58) Field of Classification Search .................. 307/110
See application file for complete search history.

(56) References Cited

U.S. PATENT DOCUMENTS

| | | | |
|---|---|---|---|
| 4,719,401 A | | 1/1988 | Altmejd |
| 6,072,691 A | * | 6/2000 | Suhara et al. ................ 361/502 |
| 6,930,467 B2 | * | 8/2005 | Suzuki ........................ 320/134 |

FOREIGN PATENT DOCUMENTS

| | | |
|---|---|---|
| DE | 100 43139 | 3/2002 |
| EP | 0 851 445 | 7/1998 |
| JP | 61 154083 | 7/1986 |
| JP | 11-225450 | * 8/1999 |
| WO | WO02/15363 | 2/2002 |

* cited by examiner

*Primary Examiner*—Michael J Sherry
*Assistant Examiner*—Luis Roman
(74) *Attorney, Agent, or Firm*—Fraser Clemens Martin & Miller LLC; William J. Clemens

(57) ABSTRACT

A circuit for the limitation of over-voltages in energy storage modules having a series circuit of energy storage elements connected between a first potential and a second potential includes voltage-limiting elements associated with combinations of the energy storage elements. Where "M" is the maximum number of directly interconnected energy storage elements of a predetermined combination, wherein for $M \geq 2$ a voltage-limiting element is connected in parallel with each combination and a respective voltage-limiting element is connected in parallel with a first energy storage element connected to the first potential and with an $n^{th}$ energy storage element connected to the second potential. For $M>2$ a respective voltage-limiting element is connected in parallel with each sub-combination of at least two directly interconnected energy storage elements of the combination having an energy storage element connected to the first potential or to the second potential.

12 Claims, 3 Drawing Sheets

US 7,414,334 B2

CIRCUIT ARRANGEMENT FOR LIMITATION OF OVER-VOLTAGES IN ENERGY STORAGE MODULES

BACKGROUND OF THE INVENTION

The present invention relates to a circuit arrangement for the limitation of over-voltages in energy storage modules composed of energy storage elements. The circuit includes a series circuit of "n" energy storage elements, wherein the series circuit is connected between a first potential and a second potential and voltage-limiting elements are associated with the "n" energy storage elements.

Energy storage modules serve for the storage of electrical energy. The storage capacity of conventional energy storage elements is usually smaller than the required total amount of energy to be stored. The maximum permissible voltage across an energy storage element is usually less than the voltage required for the application. Accordingly, several energy storage elements with smaller energy storage capacity are combined to form an energy storage module. Energy storage modules are usually designed as capacitors or accumulators. Super-capacitors (SCAP) form a special kind of capacitors. These super-capacitors are also termed thin-layer capacitors, ultracaps, boostcaps or supercaps. Super-capacitors of that kind have increasing significance as electrical energy stores for a number of applications, particularly in automobile construction or in portable electrical appliances, in which very high load quantities have to be stored or released rapidly.

However, an individual super-capacitor can be operated only with a permissible voltage $U_{max}$ of 2.3 V to 2.5 V, so that for most cases of use several super-capacitors have to be connected together in a series circuit and the energy storage module with a maximum voltage of $N \cdot U_{max}$ is formed. Super-capacitors are subject to a production tolerance which can result in a capacitance fluctuation of −10% to +30%. Moreover, capacitance losses of approximately 20% can arise due to ageing. The ageing process of super-capacitors is temperature-dependent and thus not equal for all super-capacitors contained in an energy storage module. An unequal voltage distribution between the individual energy storage elements results therefrom in the case of charging of an energy storage module containing super-capacitors. Ultimately, the super-capacitor, which due to the ageing process has the smallest capacitance, in the series circuit is loaded with the greatest voltage. However, there are various procedures for achieving a uniform voltage distribution and avoiding damage of the super-capacitors.

One possibility is selecting the super-capacitors, which are used in an energy storage module, by measuring the capacitance and a corresponding selection of the super-capacitors with small production tolerances. This has the disadvantage that selected super-capacitors of that kind with smaller tolerance are accompanied by higher production costs. Moreover, this approach does not offer any security against ageing effects, since even super-capacitors with small production tolerance are subject to ageing and exposed to losses of capacitance. Thus, the super-capacitors used in an energy storage module can be damaged, since the voltages at the individual capacitors are different.

A further possibility for protection against over-voltages due to losses of capacitance consists in operating an entire energy storage module at a lower overall voltage. However, this is disadvantageous because the entire energy storage module is not utilized efficiently. In order to avoid over-voltages at the super-capacitors it is also possible to connect, in parallel with the super-capacitors, resistances which are, however, accompanied by a high discharge current and thus produce during operation an energy loss which is consciously taken into account. If the resistances are selected to be too large, then the symmetry gain is thereby impaired. A further possibility of counteracting damage of super-capacitors of that kind in an energy storage module consists in using an active over-voltage shunt with Zener diodes. For this purpose the Zener diodes are each connected in parallel with a respective super-capacitor. However, this has the disadvantage that Zener diodes with a breakdown voltage of 2.5 V have, due to their relatively soft diode characteristic curve, equally a large spontaneous discharge below the breakdown voltage and thus are not efficient. Alternatively to use of an active over-voltage shunt by means of Zener diodes it is also possible to use integrated threshold value circuits which guarantee an active over-voltage limitation. However, threshold value circuits of that kind are usually constructed as integrated circuits and consequently relatively expensive.

A current storage installation with batteries and capacitors, in which super-capacitors are used, is shown in publication WO 02/15363 A2. As illustrated above, super-capacitors cannot take over-voltage and thus have to be monitored. In the WO 02/15363 A2 publication several different wiring variants for avoidance of over-voltages are described. There is a description of connecting a Zener diode across several super-capacitors, wherein, however, only the voltage across all super-capacitors lying in parallel with the Zener diode is limited not across a super-capacitor alone. The individual super-capacitor is thus not protected against over-voltages.

If, apart from the Zener diode connected in parallel across several super-capacitors, there is no additional protective wiring then the super-capacitor with the smaller capacitance has a greater voltage after a charging process. If the Zener diode limits the voltage to twice the respective permissible voltage of the super-capacitors the super-capacitor with the smaller capacitance is overloaded.

Ageing usually has the consequence of a decrease in capacitance. Moreover, the ageing processes advance in an accelerated manner with increased voltage, i.e. it is necessary to reckon on a halved service life in the case of a voltage increase by 0.1 V. There is thus a disastrous loop: The smaller capacitance leads to an increased voltage. The increased voltage leads to more rapid ageing and this in turn to an accelerated capacitance decline. In the case of renewed charging this element is then loaded with an even higher voltage and thus ages more rapidly. This means that the asymmetry is then amplified up to the point of total failure of the super-capacitor. This is because the smallest capacitance value in the series circuit determines the overall capacitance.

SUMMARY OF THE INVENTION

Accordingly, it is an object of the present invention to give an over-voltage protection for modules of energy storage elements which can be realized in simple and economic manner and which ensures reliable protection against damage of energy storage elements in the case of over-voltages.

It is another object of the present invention to give, in the case of use of super-capacitors in energy storage modules, a circuit arrangement which prevents damage of energy storage elements in the event of over-voltages due to tolerances in capacitance.

The present invention is based on the notion that Zener diodes offer an economic and easily connectible possibility for voltage limitation. Since energy storage elements usually have a low permissible voltage and consequently have to be used in a series circuit in order to be able to store a greater level of charge, the obvious approach would be to connect in parallel with each energy storage element, as is already known from the state of the art, a Zener diode with a small breakdown voltage corresponding with the maximum permissible voltage of the corresponding energy storage element. Since, however, the Zener diodes have for low voltages a gentle, relatively soft characteristic curve which already allows flow of a discharge current at voltages below the breakdown voltage this is disadvantageous for the overall efficiency of the energy storage module. The storage life of the overall module is reduced by the discharge current already flowing prior to the breakdown voltage. On the other hand, Zener diodes with a higher breakdown voltage have a steeper characteristic curve, so that a current flows only on attainment of the breakdown voltage.

Accordingly, in the case of the present invention there is employed a circuit arrangement in which each possible combination of "M" directly interconnected energy storage elements, wherein $M \geq 2$, is selected from the series circuit and a voltage-limiting element is connected in parallel with each possible combination of "M" directly intercoupled energy storage elements. "M" in that case denotes the maximum number of directly interconnected energy storage elements of a predetermined combination. Thus, Zener diodes with a higher breakdown voltage than the maximum permissible voltage of an individual energy storage element can be used. In order to ensure, however, that the voltage across each individual energy storage element is also monitored it is proposed to also connect a voltage-limiting element in parallel with a first energy storage element connected to the first potential and with an $n^{th}$ energy storage element connected to the second potential. If "M" is selected to be greater than 2, a respective voltage-limiting element is also connected in parallel with each sub-combination of at least two directly interconnected energy storage elements of the combination, which has an energy storage element connected to the first potential or to the second potential.

The series circuit can comprise any desired number of energy storage elements. The number "M" of the energy storage elements belonging to a combination of directly intercoupled energy storage elements can vary from circuit to circuit. Thus, in the case of a circuit of five energy storage elements, "M" can be selected to be equal to 2, 3, 4 or 5. A respective voltage-limiting element is connected in parallel with each combination of "M" energy storage elements. In addition, a respective voltage-limiting element is connected in parallel with the first and the $n^{th}$ energy storage element. Moreover, a respective voltage-limiting element is connected in parallel with all sub-combinations of at least two directly interconnected energy storage elements of the combination, which is connected to the first and the second potential. There thus results an intercalated arrangement of the voltage-limiting elements with respect to the energy storage elements with the characteristic that each energy storage element is bridged over by at least two, voltage-limiting elements and thus an over-voltage across an individual energy storage element is also recognized and prevented.

Since the maximum voltage of energy storage elements connected in series results from the sum of the maximum permissible voltages $U_{max}$, a Zener diode with a breakdown voltage corresponding with $M \cdot U_{max}$ can be employed for voltage limitation over a combination of "M" directly interconnected energy storage elements. The maximum permissible voltage $U_{max}$ of super-capacitors lies at, for example, approximately 2.3 V to 2.5 V and thus the maximum permissible voltage across a combination of two super-capacitors lies at a maximum of $2 \cdot U_{max} = 5$ V. For this reason economic Zener diodes with a breakdown voltage of 5 V can be used for voltage limitation, these diodes providing an economic over-voltage protection.

The voltage-limiting element across the first and the last or $n^{th}$ energy storage element of the series circuit of energy storage elements has to have a breakdown voltage corresponding with the maximum permissible voltage of the bridged-over first or $n^{th}$ energy storage element. In one simple realization, a respective Zener diode of the breakdown voltage of 2.5 V is connected in parallel with the first and the last or $n^{th}$ energy storage element. This is disadvantageous to the extent that a Zener diode with the small breakdown voltage of 2.5 V has a relatively soft characteristic curve and a discharge current below the breakdown voltage. Accordingly, in an advantageous embodiment it is proposed to realize the voltage-limiting elements for the first and $n^{th}$ energy storage element by means of an integrated circuit with an over-voltage protection function. Due to the intercalated arrangement of the voltage-limiting elements and the additional safeguarding of the first and $n^{th}$ energy storage element an overvoltage is securely diverted from every energy storage element although only simple Zener diodes are used for the over-voltage protection. It is thereby made possible to provide an economic over-voltage protection for all energy storage elements of an energy storage module and thus to protect the energy storage module, in the case of losses in capacitance, against a possible total failure of energy storage elements.

In a special embodiment of the present invention it is proposed that the energy storage module comprises, as energy storage elements, not only super-capacitors, but also accumulators, which are combined in an application-dependent manner into a series circuit, wherein for limitation of over-voltage appropriate voltage-limiting elements with a matched breakdown voltage or threshold voltage have to be selected.

In an advantageous embodiment of the present invention respective combinations of three energy storage elements are used, wherein then a respective voltage-limiting element is connected in parallel across three energy storage elements. Every combination from the series circuit of the energy storage module, which directly connects together three energy storage elements in series, is bridged over by a voltage-limiting element. In the case of such a connection of the voltage-limiting elements it is necessary to connect a further voltage-limiting element not only across the sub-combination consisting of the first and second energy storage element, but also across the sub-combination consisting of the $n^{th}$ and the $(n-1)^{th}$ energy storage element. A voltage-limiting element is also connected in parallel across the first energy storage element and across the $n^{th}$ energy storage element. In the case of the voltage limitation for the respective first and $n^{th}$ energy storage element it is to be noted that the corresponding breakdown voltage for the over-voltage protection has to be selected to be low, wherein only a breakdown voltage of $2 \cdot U_{max}$ of each energy storage element is selected for the sub-combination of the first and second and $n^{th}$ and $(n-1)^{th}$ energy storage element.

Beyond that it is also conceivable to construct a circuit in which four or more energy storage elements are bridged over by a voltage-limiting element, wherein then a breakdown voltage of $M \cdot U_{max}$ has to be used for the voltage-limiting elements.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
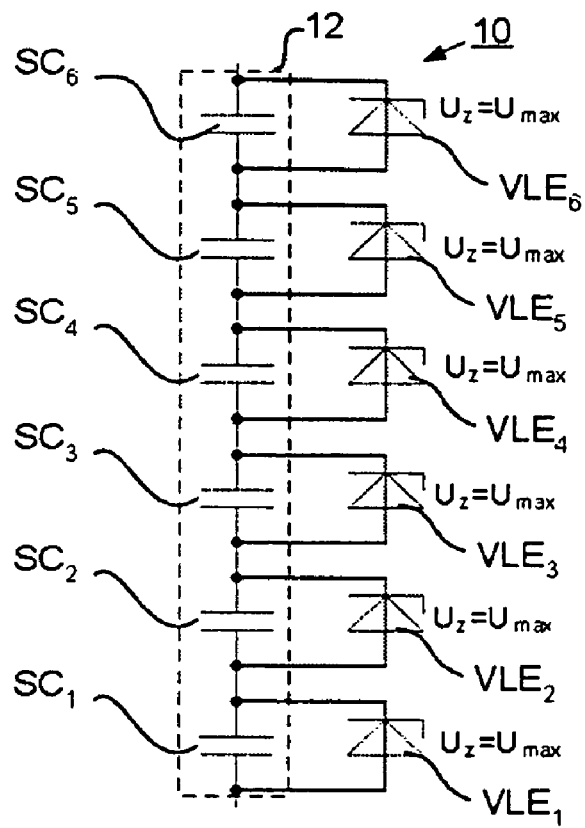
FIG. 1 is a schematic circuit arrangement with super-capacitors and parallel connected Zener diodes according to the prior art.

FIG. 1 shows a prior art energy storage module 10 with six super-capacitors $SC_1$ to $SC_6$, which are combined with one another to form a series circuit 12. A Zener diode $VLE_1$-$VLE_6$ serving as a voltage limitation device is connected in parallel with each super-capacitor $SC_1$ to $SC_6$ respectively. Each Zener diode $VLE_1$-$VLE_6$ has a breakdown voltage $U_Z$ corresponding with the maximum permissible voltage $U_{max}$ of a super-capacitor. As previously explained, the maximum permissible voltage $U_{max}$ of a super-capacitor amounts to 2.3 V to 2.5 V. This means that each Zener diode, which is also termed VLE (Voltage Limited Element), has a breakdown voltage $U_Z$ of 2.5 V. Different characteristic curves for Zener diodes are juxtaposed in FIG. 5. It can be recognized that the characteristic curves of the Zener diode in the region between 2 V and 3 V breakdown voltage have a gentle characteristic curve path. This means that even before attainment of the breakdown voltage $U_Z$ a current flows which reduces the storage life of the corresponding super-capacitor and thus the storage life of the entire energy storage module.

Figure 2:
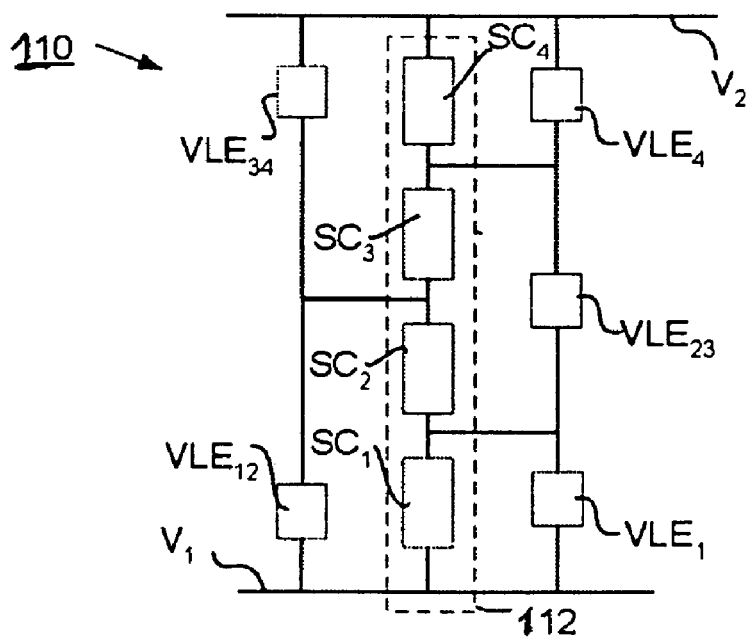
FIG. 2 is a block diagram circuit arrangement of an energy storage module according to the present invention.

A schematic circuit arrangement for protection against over-voltage of energy storage modules is illustrated in FIG. 2. This circuit arrangement according to the present invention comprises an energy storage module 110 consisting of four energy storage elements $SC_1$ to $SC_4$. Each combination of "M" directly intercoupled energy storage elements $SC_1$ to $SC_4$, wherein M=2, is bridged over by a voltage-limiting element $VLE_{12}$, $VLE_{23}$, $VLE_{34}$. In the case of a series circuit of the four energy storage elements $SC_1$ to $SC_4$ three combinations each of two energy storage elements are thus bridged over by a respective voltage-limiting element VLE. Double the voltage value of the maximum permissible voltage $U_{max}$ of the two energy storage elements can then be selected for the voltage limitation. In order to ensure that in the case of this example of embodiment the first and last energy storage element $SC_1$ and $SC_4$ of the energy storage module 110 are also protected against over-voltage as a consequence of loss of capacitance these energy storage elements $SC_1$ and $SC_4$ are also each individually bridged over by a respective voltage-limiting element $VLE_1$ and $VLE_4$. In that case it is to be noted that the threshold voltage for over-voltage protection at the first and last energy storage element $SC_1$ and $SC_4$ corresponds with the simple maximum permissible voltage $U_{max}$ of the respective energy storage element $SC_1$ or $SC_4$.

Figure 3:
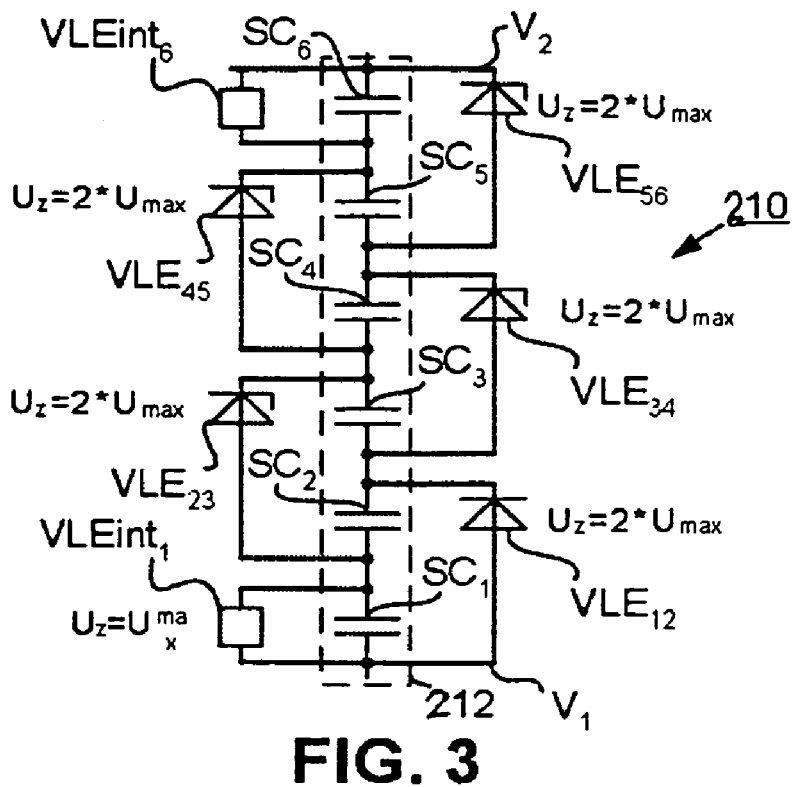
FIG. 3 is a circuit schematic of the arrangement similar to FIG. 2 with super-capacitors and Zener diodes as voltage-limiting elements and M=2.

FIG. 3 shows an alternate embodiment energy storage module 210 similar to the circuit arrangement shown in FIG. 2, in which six super-capacitors $SC_1$ to $SC_6$ are connected as energy storage elements to form a series circuit 212. The voltage-limiting elements $VLE_{12}$, $VLE_{23}$, $VLE_{34}$, $VLE_{45}$ and $VLE_{56}$ are constructed as Zener diodes, wherein the voltage-limiting elements at the first and sixth energy storage elements $SC_1$ and $SC_6$ are each constructed as a respective integrated circuit $VLEint_1$ and $VLEint_6$.

In the case of a series circuit of six super-capacitors and M=2, there is the result that in this series circuit 212 five different possible combinations of directly intercoupled energy storage elements or super-capacitors are present. These combinations each of two super-capacitors are respectively bridged over by a Zener diode $VLE_{12}$, $VLE_{23}$, $VLE_{34}$, $VLE_{45}$ or $VLE_{56}$ having twice the maximum permissible voltage $U_{max}$ as breakdown voltage $U_Z$. A voltage corresponding with twice the maximum permissible voltage $U_{max}$ of approximately 5 V of the two super-capacitors is thus diverted by way of the respective Zener diode and destruction of the super-capacitor is prevented. The first super-capacitor $SC_1$ and the sixth super-capacitor $SC_6$ are each bridged over by a respective integrated circuit with an over-voltage protection function $VLEint_1$ and $VLEint_6$ having a threshold value voltage of 2.5 V. The integrated circuits $VLEint_1$ and $VLEint_6$ have a steeper characteristic curve than a Zener diode with 2.5 V breakdown voltage.

Figure 4:
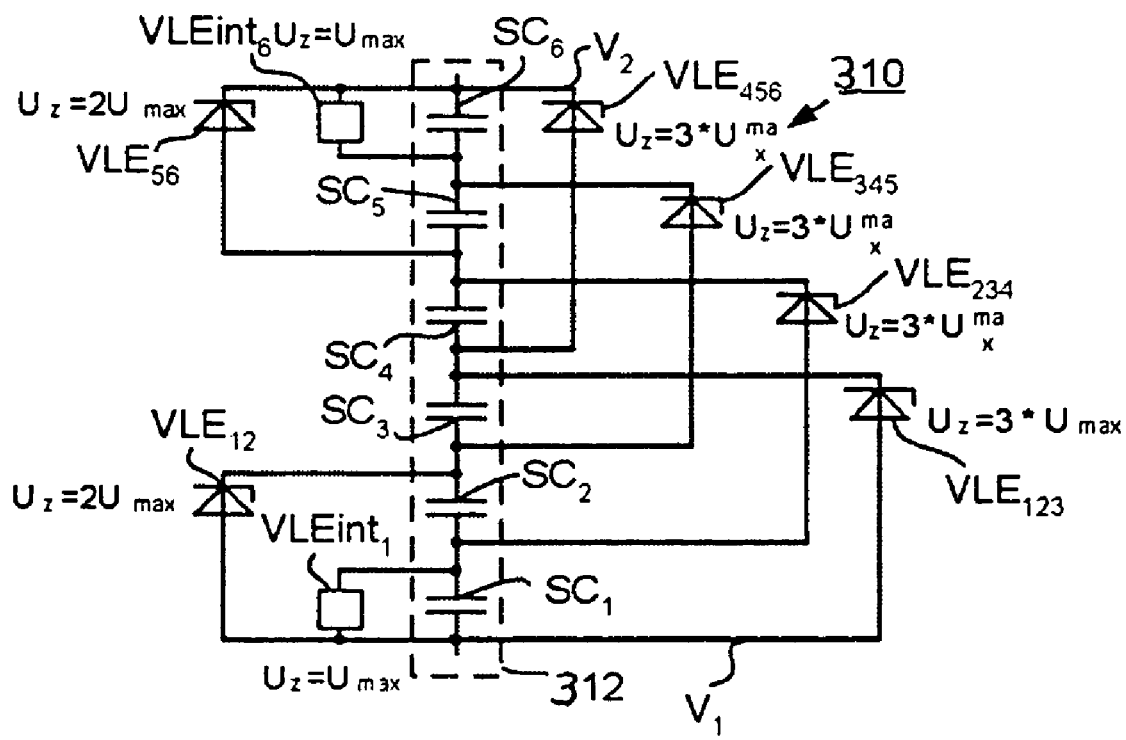
FIG. 4 is a circuit schematic of the arrangement similar to FIG. 3 with super-capacitors and Zener diodes and M=3.

FIG. 4 shows a further energy storage module 310 with six super-capacitors $SC_1$ to $SC_6$ interconnected to form a series circuit 312. In this case "M" is selected to be equal to 3. In the series circuit 312 consisting of the six super-capacitors $SC_1$ to $SC_6$ this energy storage module 310 has four combinations of super-capacitors directly interconnected. These are the super-capacitors $SC_1$ to $SC_3$, which are bridged over by a Zener diode $VLE_{123}$ having a breakdown voltage of approximately 7.5 V. The combination consisting of the super-capacitors $SC_2$ to $SC_4$ is bridged over by a Zener diode $VLE_{234}$ similarly having a breakdown voltage of 7.5 V. The next combination $SC_3$ to $SC_5$ is bridged over by a Zener diode $VLE_{345}$ and the last combination consisting of $SC_4$ to $SC_6$ is similarly bridged over by a Zener diode $VLE_{456}$. In order to also provide over-voltage protection for the first and last super-capacitors $SC_1$ and $SC_6$ these are each bridged over by a respective integrated circuit $VLEint_1$ and $VLEint_6$ with an over-voltage protection function, each having a threshold value voltage of 2.5 V. In addition, the sub-combination, consisting of $SC_1$ and $SC_2$, connected to the first potential $V_1$ is bridged over by a Zener diode $VLE_{12}$ with a breakdown voltage of 5 V and the super-capacitors $SC_5$ and $SC_6$ are bridged over by a Zener diode $VLE_{56}$ having a breakdown voltage of 5 V. It is ensured in the circuit module 310 of that kind that each super-capacitor $SC_1$ to $SC_6$ is protected against over-voltage due to ageing and loss in capacitance.

Figure 5:
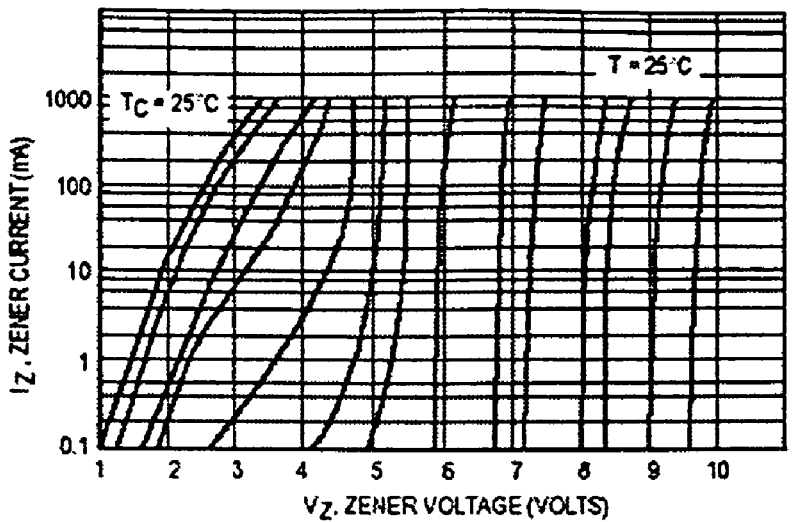
FIG. 5 is a plot of different characteristic curves of Zener diodes.

FIG. 5 shows, as already explained above, several characteristic curve paths for Zener diodes. It can be clearly recognized that the Zener diodes with a breakdown voltage of above 5 V have a significantly steeper characteristic curve than Zener diodes with a breakdown voltage below 5 V.

Figure 6:
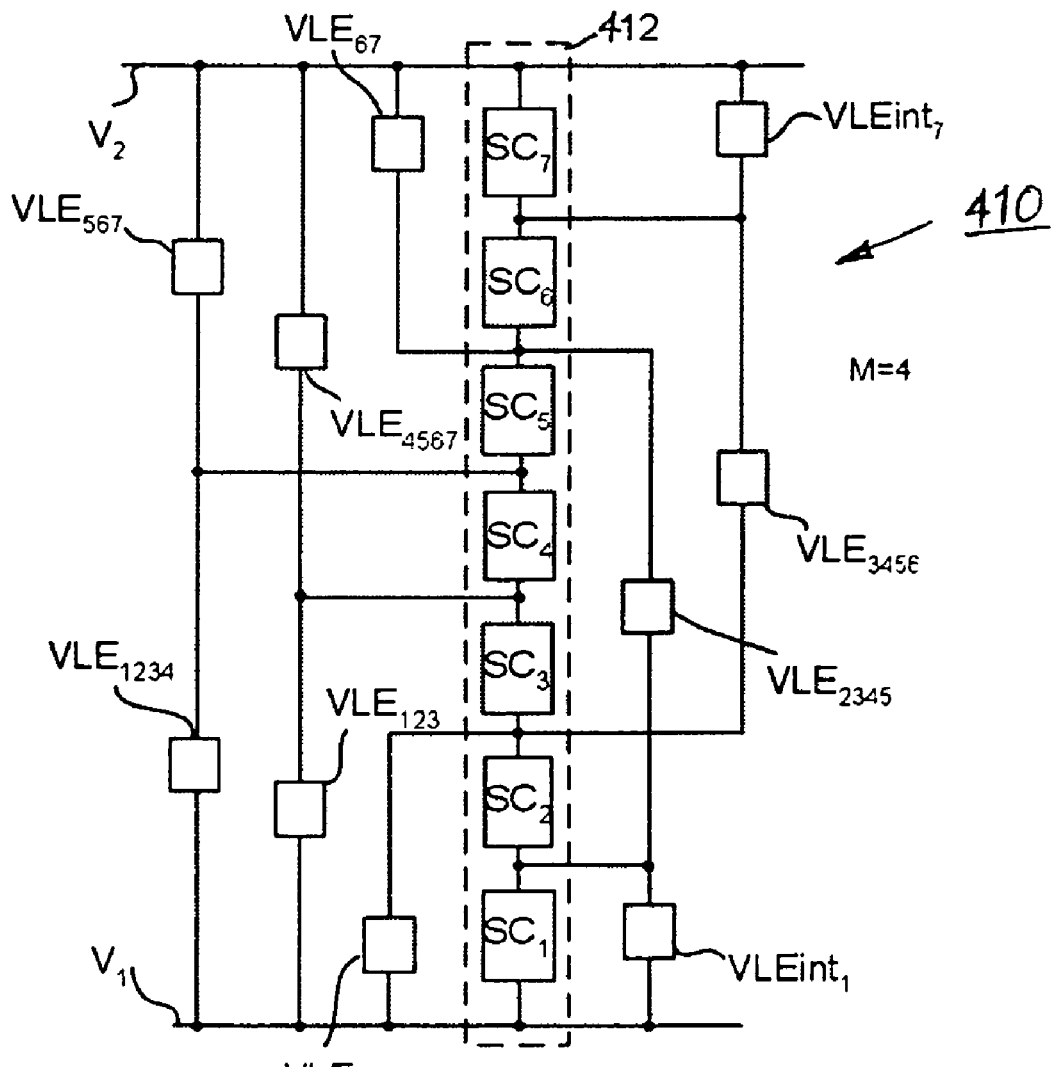
FIG. 6 is a block diagram circuit arrangement of an energy storage module according to the present invention with M=4.

In FIG. 6 there is illustrated a further example of a circuit embodiment 410 in which seven super-capacitors are interconnected in a series circuit 412. In this example of embodiment M=4, i.e. in each instance four super-capacitors are bridged over by a voltage-limiting element. This has the advantage that it is possible to use, for this over-voltage protection, Zener diodes $VLE_{1234}$, $VLE_{2345}$, $VLE_{3456}$ and $VLE_{4567}$ with a quadruple voltage of the maximum permissible voltage of an energy storage element as breakdown voltage. Moreover, the sub-combinations, which are necessary in the case of M=4, of directly interconnected energy storage elements connected to the first potential $V_1$ and to the second potential $V_2$ are bridged over by a voltage-limiting element. These are, particularly for M−1, the sub-combination $SC_1$, $SC_2$, $SC_3$ at the first potential $V_1$ and the sub-combination $SC_5$, $SC_6$, $SC_7$ at the second potential $V_2$. In the case of M=4 the sub-combination $SC_1$ and $SC_2$ and the sub-combination $SC_6$ and $SC_7$ also must each be bridged over by a respective voltage-limiting element $VLE_{12}$ or $VLE_{67}$. Beyond that, the respective first and seventh energy storage elements $SC_1$ and $SC_7$ have to be bridged over by a respective voltage-limiting element $VLEint_1$ or $VLEint_7$.

It is ensured by the circuit arrangement according to the present invention that an economic over-voltage protection is present for assembled energy storage modules of super-capacitors. Due to the use of Zener diodes with high breakdown voltage only a very low discharge current below the breakdown voltage occurs, whereby premature discharge of the energy storage module due to the system is avoided. Moreover, through the use of Zener diodes with high breakdown voltage as voltage-limiting elements it is possible to tolerate high fluctuations in capacitance. Not least, energy storage modules have a high service life since damage due to loss of capacitance produced by ageing is suppressed.

The limiting or balancing circuit according to the present invention is preferably suited to be used in the case of a battery with maximum input voltage of 42 V and minimum output voltage of 25 V and with a life time of approximately fifteen years.

Such a battery is made preferably by several super-capacitors, which are disposed on a first printed circuit board (PCB) and covered by a second PCB. Both PCBs exhibit contact areas for the super-capacitors and the corresponding components of the balancing circuit.

Above the upper PCB a foam rubber plate is set as a spring element to maintain contact pressure. Two other metal or plastic plates are laid on the upper foam rubber plate and under the lower PCB. All five plates have holes therein for vertical fixation bolts, which are tightened to produce enough contact pressure between super-capacitors and the lower and upper PCBs.

Four super-capacitors are for example bridged by one Zener diode (M=4).

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A circuit for limiting over-voltages in energy storage modules with a plurality of energy storage elements connected in series circuit and wherein the series circut is connected between a first potential and a second potential comprising:
a number "n" of energy storage elements connected in series between a first potential source and a second potential source wherein "M" is a maximum number of directly interconnected ones of said energy storage elements in a combination of less than all of said energy storage elements; and
a plurality of voltage-limiting elements wherein for M≧2 a respective one of said voltage-limiting elements is connected in parallel with each of the combinations of said energy storage elements, another one of said voltage-limiting elements is connected in parallel with a first one of said energy storage elements connected to the first potential and a further one of said voltage-limiting elements is connected in parallel with an $n^{th}$ one of said energy storage elements connected to the second potential, and wherein for M>2 a respective one of said voltage-limiting elements is connected in parallel with each sub-combination of at least two directly interconnected ones of said energy storage elements of the combination having said first one of said energy storage elements connected to the first potential and the combination having said $n^{th}$ one of said energy storage elements connected to the second potential, and wherein each of said energy storage elements other than said first one of said energy storage elements and said $n^{th}$ one of said energy storage elements is not individually bridged over by any one of said voltage-limiting elements whereby a discharge current of said voltage-limiting elements below a breakdown voltage is reduced.

2. The circuit according to claim 1 wherein said energy storage elements are one of a super-capacitor and an accumulator.

3. The circuit according to claim 1 wherein said voltage-limiting elements are Zener diodes.

4. The circuit according to claim 1 wherein said voltage-limiting elements each limit a voltage of said energy storage elements which are connected in parallel therewith to a voltage which results from a sum of maximum permissible voltages of individual ones of said energy storage elements of the respective combination or sub-combination.

5. The circuit according to claim 1 wherein said voltage-limiting elements connected to the combinations are Zener diodes with a breakdown voltage of $M \cdot U_{max}$ and said voltage-limiting elements for the first energy storage element and the $n^{th}$ energy storage element are Zener diodes with a breakdown voltage of $U_{max}$ or integrated circuits with an over-voltage protection function and wherein said voltage-limiting elements for each sub-combination are Zener diodes with a breakdown voltage of $K \cdot U_{max}$ or integrated circuits with an over-voltage protection function, wherein K is a number of said energy storage elements of the sub-combination.

6. A circuit for limiting over-voltages in energy storage modules with a plurality of energy storage elements connected in series circuit and wherein the series circuit is connected between a first potential and a second potential comprising:
a number "n" of energy storage elements connected in series between a first potential source and a second potential source, said energy storage elements being grouped in combinations of a number "M" of directly interconnected ones of said energy storage elements; and
a plurality of voltage-limiting elements wherein for M=2 each of the combinations of said energy storage elements has a respective one of said voltage-limiting elements connected in parallel therewith, another one of said voltage-limiting elements is connected in parallel with a first one of said energy storage elements connected to the first potential and a further one of said voltage-limiting elements is connected in parallel with an $n^{th}$ one of said energy storage elements connected to the second potential, and wherein each of said energy storage elements other than said first one of said energy storage elements and said $n^{th}$ one of said energy storage elements is not individually bridged over by any one of said voltage-limiting elements whereby a discharge current of said voltage-limiting elements below a breakdown voltage is reduced.

7. The circuit according to claim 6 wherein said energy storage elements are one of a super-capacitor and an accumulator.

8. The circuit according to claim 6 wherein said voltage-limiting elements are Zener diodes.

9. The circuit according to claim 6 wherein said ones of said voltage-limiting elements connected in parallel with the combinations are Zener diodes and said another one and said further one of said voltage limiting elements are integrated circuits with an over-voltage protection function.

10. The circuit according to claim 6 wherein for M>2 a respective one of said voltage-limiting elements is connected in parallel with each sub-combination of at least two directly interconnected ones of said energy storage elements of the combination having said first one of said energy storage elements connected to the first potential and the combination having said $n^{th}$ one of said energy storage elements connected to the second potential.

11. The circuit according to claim 10 wherein said voltage-limiting elements each limit a voltage of said energy storage elements which are connected in parallel therewith to a voltage which results from a sum of maximum permissible voltages of individual ones of said energy storage elements of the respective combination or sub-combination.

12. The circuit according to claim 10 wherein said voltage-limiting elements connected to the combinations are Zener diodes with a breakdown voltage of $M \cdot U_{max}$ and said voltage-limiting elements for the first energy storage element and the $n^{th}$ energy storage element are Zener diodes with a breakdown voltage of $U_{max}$ or integrated circuits with an over-voltage protection function and wherein said voltage-limiting elements for each sub-combination are Zener diodes with a breakdown voltage of $K \cdot U_{max}$ or integrated circuits with an over-voltage protection function, wherein K is a number of said energy storage elements of the sub-combination.

* * * * *